(12) United States Patent
Humbert et al.

(10) Patent No.: US 8,453,575 B2
(45) Date of Patent: Jun. 4, 2013

(54) PYROTECHNICAL METHOD FOR DUAL-MODE GAS GENERATION AND RELATED PYROTECHNICAL GENERATOR

(75) Inventors: Pierre Humbert, Boutigny sur Essonne (FR); Marc Sorgiati, Ballancourt sur Essonne (FR); Anthony Schyns, Saint Medard En Jalles (FR)

(73) Assignee: Herakles, Le Haillan (FR)

( * ) Notice: Subject to any disclaimer, the term of this patent is extended or adjusted under 35 U.S.C. 154(b) by 825 days.

(21) Appl. No.: 12/444,632

(22) PCT Filed: Oct. 8, 2007

(86) PCT No.: PCT/FR2007/520090
§ 371 (c)(1),
(2), (4) Date: Dec. 18, 2009

(87) PCT Pub. No.: WO2008/043946
PCT Pub. Date: Apr. 17, 2008

(65) Prior Publication Data
US 2010/0083863 A1 Apr. 8, 2010

(30) Foreign Application Priority Data
Oct. 9, 2006 (FR) .................................... 06 54144

(51) Int. Cl.
*C06D 5/00* (2006.01)
(52) U.S. Cl.
USPC ........... 102/530; 102/531; 280/736; 280/741; 280/742
(58) Field of Classification Search
USPC .................. 102/530, 531; 280/736, 741, 742
See application file for complete search history.

(56) References Cited

U.S. PATENT DOCUMENTS

| 3,711,115 A | 1/1973 | Lohr |
| 3,985,592 A | 10/1976 | Hackett et al. |
| 5,839,754 A | 11/1998 | Schlüter et al. |
| 5,967,550 A | 10/1999 | Shirk et al. |
| 6,068,291 A | 5/2000 | Lebaudy et al. |

(Continued)

FOREIGN PATENT DOCUMENTS

| DE | 195 41 924 A1 | 5/1997 |
| DE | 199 03 237 A1 | 8/2000 |

(Continued)

OTHER PUBLICATIONS

Davenas, Alain, "Solid Rocket Propulsion Technology", Pergamon Press, 1993, p. 13.

(Continued)

*Primary Examiner* — J. Woodrow Eldred
(74) *Attorney, Agent, or Firm* — Hamre, Schumann, Mueller & Larson, P.C.

(57) ABSTRACT

The subject of the present invention is a pyrotechnic method for generating gas at two successive flow rates—a first flow rate then a second flow rate, said first flow rate being higher than said second flow rate—which comprises:
the combustion of a first pyrotechnic charge (10) in a first combustion chamber (1) discharging into a second combustion chamber (2) via at least one nozzle (3); and
the combustion of a second pyrotechnic charge (20) in said second combustion chamber (2) discharging to the outside via at least one vent (21). Characteristically, said first chamber (1) operates at high pressure and said second chamber (2) operates at low pressure.
Another subject of the invention is a pyrotechnic gas generator suitable for the implementation of said method.
The invention is most particularly applicable in the context of side protection airbags ("curtain airbags"), used in automobile safety.

22 Claims, 1 Drawing Sheet

U.S. PATENT DOCUMENTS

| | | | |
|---|---|---|---|
| 6,314,888 B1 | 11/2001 | Müller et al. | |
| 6,406,053 B1 | 6/2002 | Bayer et al. | |
| 6,485,051 B1 | 11/2002 | Taguchi et al. | |
| 6,601,872 B2 * | 8/2003 | Zimbrich et al. | 280/737 |
| 6,786,507 B2 | 9/2004 | Dölling et al. | |
| 6,808,202 B2 | 10/2004 | Lebaudy et al. | |
| 6,874,813 B2 | 4/2005 | Perotto et al. | |
| 7,814,838 B2 * | 10/2010 | McCormick | 102/530 |
| 2002/0190511 A1 | 12/2002 | Watase et al. | |
| 2003/0122355 A1 | 7/2003 | Khandhadia et al. | |
| 2006/0086408 A1 | 4/2006 | Tieu | |
| 2006/0117982 A1 | 6/2006 | Blessing et al. | |
| 2006/0119087 A1 | 6/2006 | Blessing et al. | |

FOREIGN PATENT DOCUMENTS

| | | |
|---|---|---|
| EP | 1 496 332 A1 | 1/2005 |
| FR | 2 742 483 A1 | 6/1997 |
| FR | 2 809 366 A1 | 11/2000 |
| FR | 2 829 570 A1 | 3/2003 |
| FR | 2 831 122 A1 | 4/2003 |
| FR | 2 863 986 A1 | 6/2005 |
| FR | 2 877 428 A1 | 5/2006 |
| WO | WO 01/34516 A2 | 10/1999 |
| WO | WO 2004/024653 A2 | 3/2004 |

OTHER PUBLICATIONS

P. Kuentzmann, "Introduction to Solid Rocket Propulsion", ONERA (Office National d'Etudes et de Recherhes Aerospatiales), Paper presented at the RTO/VKI Special course in "Internal Aerodynamics in Solid Rocket Propulsion", held in Rhode-Saint-Genese, Belgium, May 27-31, 2002, Published in RTO-EN-023, pp. 1-1 to 1-15.

* cited by examiner

PYROTECHNICAL METHOD FOR DUAL-MODE GAS GENERATION AND RELATED PYROTECHNICAL GENERATOR

The invention relates to a pyrotechnic method for generating gas at two consecutive operating modes making it possible to rapidly pressurize a structure then to maintain the pressure in said structure for a long time (said long time is generally from 40 milliseconds to 1 minute). The invention also relates to a pyrotechnic gas generator suitable for the implementation of said method.

The field of application of the invention relates more particularly to side protection airbags, also known as "curtain airbags", used in automobile safety. It also encompasses devices used for draining a fluid reservoir or for the displacement of a piston.

In the last two decades the automobile industry has developed airbag systems intended for protecting the occupants of vehicles in the event of a collision. These airbags are generally deployed by means of hot gases delivered by a pyrotechnic gas generator. The airbag must be deployed rapidly and remain inflated at the time of the impact. The pyrotechnic gas generators are therefore, in these cases, expected to operate in a brief period of time: of the order of a few tens of milliseconds.

Very recently, automobile manufacturers have desired to incorporate devices that use protective airbags in order to protect the occupants, not only when the vehicle is subjected to a front or side impact, but also when the vehicle rolls over following the side impact. For this, airbags known as "curtain airbags" must be rapidly deployed (a few milliseconds) at the time of the impact and then remain inflated for a period of time of the order of ten seconds.

After the deployment, the bag, in order to remain inflated, must be supplied with gas in order to compensate, on the one hand, for gas leaks (porosity of the bag, etc.) and, on the other hand, the cooling of the hot gases originating from the pyrotechnic generator.

For this application, the rapid gas generators conventionally used for front or side airbags are therefore no longer suitable since, after the inflation phase, it is necessary to continue to generate gases at a lower flow rate for about ten seconds in order to keep the bag inflated.

The gas generator suitable for this type of device must, in a first brief period of time, generate a high flow rate in order to deploy and inflate the bag then, in a second longer period of time, generate a lower gas flow rate in order to maintain the pressure in the bag. This is therefore a generator with two operating modes: the first possibly being qualified as a high flow rate mode and the second as a low flow rate mode.

This type of generator is also suitable for the pressurization of a variable-volume cavity. The targeted applications may then be the draining of a fluid reservoir or the displacement of a piston.

A person skilled in the art knows that it is possible to adjust the flow rate of a pyrotechnic device by equipping it with pyrotechnic compositions having different combustion rates and/or by using a suitable propellant block geometry and/or by adjusting the orifices for delivering the combustion gases and/or by using several pyrotechnic charges that are initiated separately.

Thus, U.S. Pat. No. 5,967,550 describes a generator containing two pyrotechnic charges of different compositions, placed in a single combustion chamber. Thus, Application WO 01/34516 describes a generator containing two pyrotechnic charges of different compositions, each placed in the two compartments of a single combustion chamber. The use of two charges obviously presents a disadvantage from an industrial point of view since it necessitates qualifying, manufacturing and handling two pyrotechnic compositions.

Many patent documents describe, furthermore, adaptive (also known as multistage) gas generators for airbags, making it possible to adjust the amount of gas generated according to need. The gas flow rate may thus be adapted as a function of various parameters such as the temperature, the nature and intensity of the impact, the size and the position of the passenger. Most of these documents (US 2002/0190511, U.S. Pat. No. 6,485,051, WO 2004/024653, U.S. Pat. Nos. 6,314,888, 6,406,053, 6,068, 291, US 2006/0119087, US 2006/0117982) describe generators having two separate and independent combustion chambers that each have an igniter that is activated independently in time. This time lag of a few milliseconds is achieved electronically and in a programmed manner so as to optimize the flow rate of the generator and therefore the pressure level in the bag.

In the technological commuity, gas generator devices having several combustion chambers equipped with a single igniter have been described. Such devices are designed to generate, in a short time interval (5 to 60 milliseconds), two different gas flow rates.

The device described in Application US 2006/0086408 comprises a first chamber equipped with an igniter and connected via orifices to the outside environment. After activation of the generator, the second combustion chamber is connected to the first, its charge is ignited by the hot gases originating from the first chamber. This second chamber discharges to the outside via the first chamber. In this case, the targeted effect is to generate a low flow rate in the first instance in order to dislodge the airbag from its receptacle and then to produce a larger flow rate in order to inflate the bag.

The two patent documents DE 195 41 924 and U.S. Pat. No. 5,839,754 describe systems that produce the same effect. This time, the igniter is extended by an igniting tube possibly containing a retarding charge, to accentuate the delay between the operation of the two flow rate modes.

Application FR 2 877 428 presents a device, subdivided internally by two partitions that delimit three chambers, namely two combustion chambers each containing a pyrotechnic charge, positioned on both sides of a pacification chamber that is open to the outside environment. An orifice passes through the partitions which allows the controlled passage of the gases generated by the combustion in the combustion chambers to the pacification chamber. This device is only equipped with a single igniter so that the gases generated by the pyrotechnic charge of one of the two combustion chambers pass through the pacification chamber and go into the second igniter-free combustion chamber where they cause the combustion of the charge which is present therein.

Patent application FR 2 863 986 describes a pyrotechnic gas generator for an airbag. Said generator comprises, in a cylindrical housing provided with a gas discharge opening and a sealed end, an internal cylindrical element housing a gas-producing agent, a filter and ignition means. According to one embodiment, said generator comprises two combustion chambers, a first combustion chamber that discharges into a second combustion chamber, itself discharging to the outside via the discharge opening. No indication is provided on the operating pressure of said two chambers. The gas-producing agents operating in said two chambers differ from one another (by at least one of their characteristics: quantity, composition, composition ratio, size, shape). It is this difference that makes it possible to adjust the gas flow rate, to obtain a dual-mode effect: high then low or low then high. The gas generator according to said Application FR 2 863 986 does not make it possible to generate a high then low flow rate using two strictly identical gas-producing agents.

Pyrotechnic devices with gas flow rate regulation that use movable members are also described, for example in Patent Application EP 1 496 332. They are also well known in the field of gas valving for an engine with thrust modulation. These systems have the main drawback of using movable members that are subjected to the streams of hot gas, increasing their cost, their complexity and their probability of failure.

The use of a monolithic pyrotechnic block with suitable geometry is conventional in the field of the propulsion of missiles in order to obtain a maximum thrust phase (known as "boost phase") followed by a cruise phase at a lower flow rate. Patent application FR 2 742 483 describes a charge of this type for a tactical missile. The corresponding articles are obtained by molding. This method is not really recommended for small-sized articles that are mass produced. Furthermore, the current compositions dedicated to automobile safety applications are often in the form of grains to be compressed that are not suitable for the molding process.

It is finally necessary to indicate the development of hybrid generators combining a pressurized gas reserve with a pyrotechnic gas generator (FR 2 831 122, FR 2 829 570, U.S. Pat. No. 6,786,507). These hybrid systems have, on the one hand, the drawback of using a pressurized gas reserve that is capable of leaking in the course of its lifetime and, on the other hand, a complex architecture for connecting the two chambers: one pyrotechnic and the other comprising a pressurized gas. In the hybrid device described in FR 2 829 570, the pyrotechnic charge is composed of propellant grains placed in bulk (not arranged) inside the channel of a cylindrical propellant block. The two charges having different geometries therefore coexist in one and the same combustion chamber. The deployment of the bag is ensured by the pressurized gas reserve heated by the operation of the gas generator, the initial flow rate of which is essentially delivered by the charge of bulk grains. The combustion of the block having a channel provides the supply of gas for keeping the bag inflated.

In such a context, a method and a device that are high performance are proposed, according to the present invention, to respond to the specifications as set out in the introduction of the present text: pyrotechnic gas generation having two successive operating modes: high initial flow rate followed by a low (lower) flow rate.

The method of the invention—a pyrotechnic method for generating gas at two successive flow rates, a first flow rate then a second flow rate, said first flow rate being higher than said second flow rate—comprises:

the combustion of a first pyrotechnic charge in a first combustion chamber discharging into a second combustion chamber via at least one nozzle; and the combustion of a second pyrotechnic charge in said second combustion chamber discharging to the outside via at least one vent.

Characteristically, said first combustion chamber operates at high pressure and said second combustion chamber operates at low pressure.

Characteristically, within the context of the method of the invention, two combustions, carried out at different pressures, are combined. The notions of "high pressure" and "low pressure" are here relative notions. The high pressure is in general at least three times higher than the low pressure. The low pressure is generally between 0.1 and 10 MPa, advantageously equal or close to atmospheric pressure (0.1 MPa), whilst the high pressure is generally between 0.3 and 30 MPa, and is advantageously around 10 MPa. For the implementation of the method of the invention, two combustion chambers operating at different pressures (see above) are used.

It is generally understood that the first flow rate, that may be qualified as a high flow rate, corresponds to the sum of the flow rates of gases initially generated by the combustion of the two pyrotechnic charges, then that the second flow rate, which may be qualified as a low flow rate, corresponds to the flow rate of gas delivered, over a longer period, during the continuation of the combustion of the charge of the second combustion chamber.

The high-pressure combustion generates gases which, via at least one nozzle, are discharged, generally directly or almost directly (it is obvious that it is thus desired to avoid any cooling of said gases) into the second combustion chamber, known as the low-pressure chamber. Said gases initiate the combustion of the second pyrotechnic charge in said second combustion chamber. Said second combustion chamber is equipped with at least one vent that discharges to the outside. It operates at low pressure. Advantageously the vent or vents of the low-pressure chamber are sized so that the flow rate of gas generated in the chamber operating at high pressure, known as the high-pressure chamber, is, in the first instants of the combustion of the first pyrotechnic charge, sufficient to pressurize the low-pressure chamber. An initial pressurization is favorable, on the one hand, for obtaining a good initiation of the combustion of the charge of the low-pressure chamber and, on the other hand, for generating a high gas flow rate in the first operating phase.

It is also understood that the charge of the high-pressure chamber finishes burning before the charge of the low-pressure chamber. The end of the combustion of the charge of the high-pressure chamber induces a pressure drop in the low-pressure chamber: the rate of combustion of the charge of the low-pressure chamber consequently decreases.

A person skilled in the art knows that the rate of combustion of the propellant is even higher when the pressure in the combustion chamber is high. It is therefore understood that the high-pressure chamber predominantly contributes to the flow rate of the gas generator during the first high flow rate phase.

The second phase of operating at low flow rate is thus provided by the sole combustion of the charge of the low-pressure chamber. Said low-pressure chamber is equipped with at least one vent. The opening diameter of said at least one vent is sufficient to make the pressurization of the chamber drop to a value close to that of the outside environment, when the charge of the high-pressure chamber has finished burning. It may be judicious to increase the number of vents in order to reduce the opening of each. This makes it possible, on the one hand, to better distribute the gases produced, for example in the device to be inflated and, on the other hand, to trap, inside the second combustion chamber, the combustion remains (residues) of the pyrotechnic charge, remains which cannot escape to the outside via small-sized orifices.

The first and second pyrotechnic charges may each be associated with an independent ignition device.

Advantageously, the method of the invention is initiated by the single ignition of the first charge in the first combustion chamber. A single pyrotechnic igniter is thus used, mounted in the high-pressure chamber. The charge of said high-pressure chamber is therefore ignited by said igniter. From the ignition of said charge onwards, the hot gases delivered penetrate into the low-pressure chamber via said at least one nozzle ("inter-chamber orifice"). Said hot gases initiate the charge of the low-pressure chamber. The charge of said low-pressure chamber then advantageously adds its gas flow rate to that of the charge from the high-pressure chamber, in order to produce a high flow rate, used, for example, in the context of a phase of deploying and of inflating a structure.

In the context of one advantageous embodiment variant, the first and second pyrotechnic charges used have the same composition.

A person skilled in the art knows that one of the parameters for controlling the pressure in each of the chambers is the klemmung (total combustion surface area/total area of the orifices of the chamber). In the context of the advantageous variant mentioned above (two charges of the same composition), the klemmung (total combustion surface area/total area of the orifices of the chamber) is inevitably larger for the high-pressure chamber than for the low-pressure chamber. Incidentally, it is noted here that independently of the composition of the charges, the klemmung of the first combustion chamber (operating at high pressure) is advantageously greater than that of the second combustion chamber (operating at low pressure).

Said first and second pyrotechnic charges may or may not have the same dimensions and/or geometries.

Thus, according to embodiment variants of the method of the invention, the first and second pyrotechnic charges may have the same composition, same dimensions and same geometry or be differentiated from one another by at least one of said parameters.

When the two charges are of identical composition, geometry and dimensions, the difference in high pressure/low pressure operation (mode) between the two chambers is solely driven by the diameters of the orifices of the two chambers. These have been referred to as nozzle(s) for the first combustion chamber (=high-pressure chamber) and as vent(s) for the second combustion chamber (=low-pressure chamber). The diameter of the at least one orifice of the high-pressure chamber must be smaller than that of the at least one orifice of the low-pressure chamber.

Surprisingly, the pyrotechnic method of the invention is a high performance method, in its simplest embodiment version, with:
  a single propellant composition;
  same geometry and dimensions of the propellant blocks (of the first and second pyrotechnic charges);
  two combustion chambers connected together by a single orifice;
  a single igniter;
  a single vent for the gases to exit to the outside.

This simplest embodiment version, with two identical charges, highlights the originality of the method of the invention. The operating principles of pyrotechnic generators of the prior art cannot result, with two identical charges, in flow rate variations without using a movable member or two igniters.

The propellant blocks often used for airbag applications are usually pellets obtained by compressing granules of energetic materials. In the hypothesis of pellets of the same composition, by playing on the diameter and the thickness of the pellets of each charge, it is possible to accentuate the difference in flow rate and in combustion time between the two chambers.

Generally, in the context of certain embodiment variants of the method of the invention, in order to accentuate the difference between the flow rates—first high flow rate and second low flow rate—and/or the combustion times of the two chambers, the two charges are differentiated. Thus:
  the first pyrotechnic charge may have a smaller thickness to be burnt than that of said second charge (second charge that is intended to burn as long as possible);
  the propellant element (the propellant elements) constituting the second pyrotechnic charge may have at least one of its (their) combustion surfaces inhibited. It is thus sought to prolong, in this way, the combustion time of said second charge. Optionally, the arrangement of the block or blocks in the low-pressure combustion chamber is such that the flame front only spreads over a single face of the block or blocks. Optionally, the block or blocks may be partly inhibited in order to obtain a frontal combustion (known as end burning).

Generally, the first pyrotechnic charge is composed of a single propellant element or of several propellant elements, placed in bulk or arranged, advantageously placed in bulk, and, independently, the second pyrotechnic charge is composed of a single propellant element or of several propellant elements, placed in bulk or arranged.

The pyrotechnic charge of the high-pressure chamber is thus advantageously composed of one or more bulk propellant elements (pellets, strands, etc.) of small dimensions such as, for example, those normally used for airbag applications. This type of charge conventionally makes it possible to generate a large amount of gas during a short time interval in order to ensure the deployment and inflation of the bag. The high pressure in the chamber is provided both by the large combustion surface area of this type of charge and by the small diameter of said at least one nozzle separating the two chambers. The high operating pressure leads to a high rate of combustion that is favorable to obtaining a high flow rate of gas.

The pyrotechnic charge of the low-pressure chamber is advantageously present in the form of at least one propellant block that operates at low pressure. Said charge has a larger thickness to be burnt than that of the charge of the high-pressure chamber. The combustion time of said charge operating at low pressure is longer than that of the advantageously bulk charge operating at high pressure. In the case where the charge is composed of several monolithic blocks, the latter are advantageously stacked on top of one another. The blocks then gradually ignite with the advance of the combustion front. This makes it possible to maintain the gas flow rate for a longer time than that generated by the bulk charge. The charge of the low-pressure chamber therefore continues to burn after the end of combustion of the charge of the high-pressure chamber. This makes it possible, in particular, to maintain the pressure in an inflatable structure after it has been deployed. The length of the blocks used may especially vary between 5 and 10 mm, in the case of a binder-free composition used in the field of automobile safety.

The composition of the pyrotechnic charges of the invention advantageously comprises basic copper nitrate as an oxidizing charge and guanidine nitrate as a reducing charge. It very advantageously comprises basic copper nitrate as the only oxidizing charge and guanidine nitrate as the only reducing charge. Such a basic copper nitrate/guanidine nitrate combination is in fact known for having, in the field of automobile safety (driver-type airbags), a combustion rate that is already fairly low compared to those of other compositions used in this field. In the case of this very advantageous variant, said composition generally comprises:
  from 45 to 55% by weight of guanidine nitrate;
  from 40 to 50% by weight of basic copper nitrate; and
  from 0 to 5% by weight of additives.

The method of the invention is furthermore advantageously carried out so that the gases generated in the first combustion chamber are discharged, from the second combustion chamber, via said at least one vent (that leads to the outside), without flowing through the second pyrotechnic charge.

If necessary, the gases produced by the combustion of the second pyrotechnic charge are cooled within the second combustion chamber.

A person skilled in the art, considering the aforegoing, has understood every advantage of the method of the invention. Said advantage is even greater that the device, used for carrying out said method, is of easy production.

According to its second subject matter, the present invention relates to a new type of pyrotechnic gas generator having two combustion chambers, suitable for implementing the method described above.
Characteristically:
  said two combustion chambers communicate via at least one nozzle; and
  one of them, which does not lead to the outside, is capable of operating at high pressure, whereas
  the other, which leads to the outside via at least one vent, is capable of operating at low pressure.

The geometry of such a generator is advantageously cylindrical.

The combustion chamber capable of (designed for) operating at high pressure may be integrated into the combustion chamber capable of (designed for) operating at low pressure. In another variant, the two chambers are contiguous, so that the two pyrotechnic charges are destined to be opposite one another.

The klemmung of the chamber capable of operating at high pressure is advantageously greater than the klemmung of the chamber capable of operating at low pressure.

Within the context of one advantageous embodiment variant, a single pyrotechnic igniter is used, mounted on the body of the generator, level with the chamber capable of operating at high pressure, that does not lead to the outside (first combustion chamber=high-pressure chamber).

Furthermore, in the structure of the generator of the invention, said at least one vent made in the body of said chamber capable of operating at low pressure is advantageously at a level such that it permits the discharge of the gases generated in the chamber capable of operating at high pressure without these gases flowing through the pyrotechnic charge of the chamber capable of operating at low pressure. The pyrotechnic charge of the chamber capable of operating at low pressure may thus be a solid inhibited block with frontal combustion, having a diameter equivalent to that of said chamber. A person skilled in the art knows that such blocks are opportunely used when it is a question of generating low flow rates over long periods. Thus, in a construction with the two chambers (and the two charges) opposite one another, the vent (the vents) of the low-pressure chamber is (are) advantageously positioned on the body of said chamber, between the inter-chamber separation orifice(s) (nozzle(s)) and the charge of said chamber.

It has furthermore been seen that the gases originating from the combustion of the second charge are capable of being cooled within the second combustion chamber. According to one embodiment variant, said second combustion chamber (capable of operating at low pressure) therefore comprises means for cooling the gases generated within it. Such means incorporate a cooling agent, such as water or, advantageously, any other liquid or solid having a high calorific value that is capable of being vaporized at high temperature (in contact with the combustion gases). Advantageously, the cooling agent remains in the liquid phase at a lower temperature than that of water. It may especially consist of the agent Novec 1230® sold by 3M. Such means advantageously consist of at least one capsule, capable of gradually releasing the agent that it contains during the combustion of the charge for maintaining the pressure (second pyrotechnic charge). It may especially be toroidal capsules surrounding the pyrotechnic charge or capsules inserted into the inter-element (advantageously inter-block) interstices of said charge.

It is now proposed to recall, in a manner that is in no way limiting, characteristics of the method and device of the invention with reference, firstly, to the appended figures, then to the example presented.

FIG. 1 is a diagram of a loaded generator of the invention suitable for the implementation of the method of the invention.

FIG. 2 schematically illustrates the presence of a cooling agent in the low-pressure combustion chamber of said generator.

Figure 1:
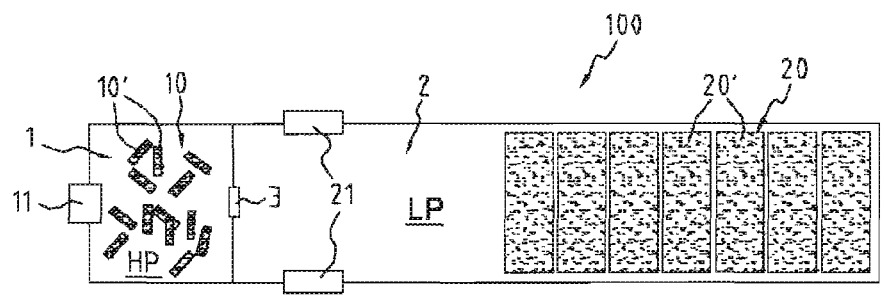
Figure 2:
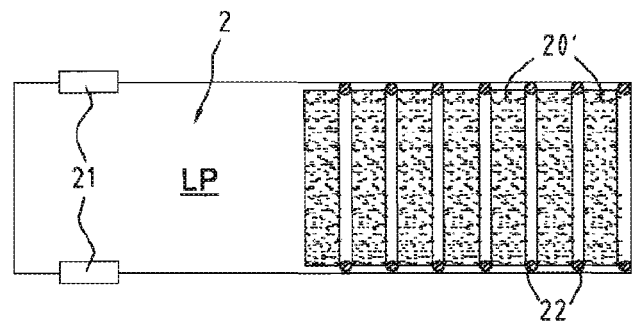
Figure 3:
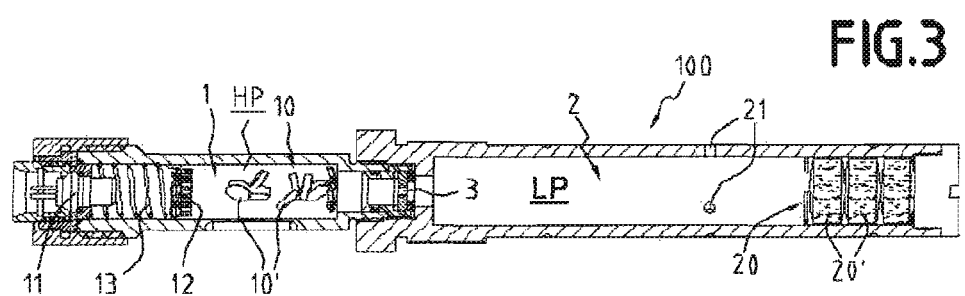
FIG. 3 shows one particular exemplary embodiment of a (loaded) generator of the invention suitable for the implementation of the method of the invention.

In FIGS. 1 to 3, the same references have been used.

The generator 100 comprises two combustion chambers 1 and 2:
  the combustion chamber 1 is that which operates at high pressure HP; and
  the combustion chamber 2 is that which operates at low pressure LP.

Said two chambers 1 (HP) and 2 (LP) communicate via the nozzle 3.

The gases generated, originating from the chamber 1 and from the chamber 2, are discharged to the outside via the vents 21.

The pyrotechnic charge 10 of the combustion chamber 1 is composed of n pellets 10' of propellant.

The pyrotechnic charge 20 of the combustion chamber 2 is composed of m blocks 20' of propellant.

The igniter capable of igniting the charge 10 has been given the reference 11.

In FIG. 2, cooling means 22 for cooling the combustion gases generated in the chamber 2 (LP) have been shown. Said means 22 are in the form of toroidal capsules.

With reference to FIG. 3, it can be seen that the two combustion chambers 1 and 2 are cylindrical, that the generator 100 has a cylindrical geometry. Shown in said FIG. 3 as 12 is a pyrotechnic charge ignition relay and as 13 a spring for holding said pyrotechnic charge ignition relay 12 and the charge 10 of the chamber 1.

In FIGS. 1 and 3, it is clearly seen that the two charges 10 and 20 are positioned opposite one another, the vents 21 of the chamber 2 being positioned in the body of said chamber 2 between the nozzle 3 and the charge 20 of said chamber 2 (advantageous variant).

Figure 4:
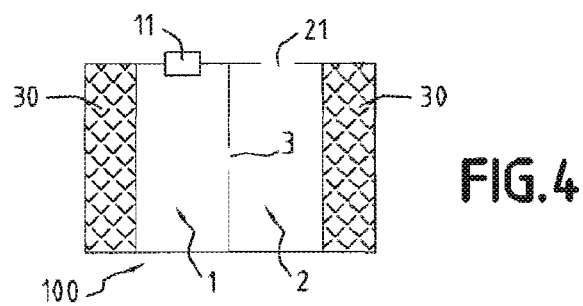
FIG. 4 is a diagram of a loaded generator of the invention suitable for the implementation of the method of the invention in its simplest version (with two strictly identical charges).

In FIG. 4 (very schematic), there is a generator 100 of the invention, of the same type as that from FIGS. 1 and 3 (the same references are used for the various constituent elements of said generator). However, in each of the two chambers 1 and 2 of said generator 100, the same pyrotechnic charge, a single propellant block 30, is used. The originality and the advantage of the method of the invention, shown here in its simplest embodiment variant, clearly stands out from considering this figure.

EXAMPLE

A generator of the type of the invention was designed for rapidly pressurizing (inflating) a structure by rapidly delivering a high flow rate of gas and then maintaining the pressure within said structure for a long time t (10 milliseconds<t<1 min), while delivering a lower flow rate of gas.

The length of the whole of the generator is 220 mm for an internal diameter of 17 mm. The length of the chamber operating at low pressure is 123 mm, this length is adjusted as a function of the dimensions of the charge for maintaining the pressure. Said generator is as represented in FIG. 3. The charge ignition relay typically has a mass of 0.4 g.

The generator of the invention was tested with pellets and blocks having the same weight composition, a composition known from the prior art (see, in particular, WO 2006/047085) and consisting of a mixture of basic copper nitrate, guanidine nitrate and alumina (additive).

The pyrotechnic charge of the high-pressure chamber is composed of 4 g of pellets having a diameter of 6 mm for a thickness of 1.8 mm. Said pellets are used in bulk.

The orifice separating the two chambers has a diameter of 3 mm.

A maximum value of the pressure in the high-pressure chamber is 20 MPa, during the operation of the charge, for an operating time of 40 milliseconds.

The pyrotechnic charge of the low-pressure chamber is composed of 3 to 10 g of stacked cylindrical blocks each measuring 17 mm in diameter by 9 mm in thickness. The body of said low-pressure chamber is equipped with three vents having diameters of 3 mm.

The pressure in the low-pressure chamber, during the combustion phase of the pyrotechnic charge of the other chamber, is around 2 MPa. After the end of the combustion of said charge of the high-pressure chamber, said pressure in said low-pressure chamber is (almost) identical to that outside the generator (~close to ambient pressure). This characteristic orients the choice of the pyrotechnic composition which must have a stable combustion at low pressure.

The combustion time of the charge of the low-pressure chamber is from 60 s to 2 s depending on the configuration of the charge of the stack.

The invention claimed is:

1. A pyrotechnic method for generating gas at two successive flow rates, a first flow rate and then a second flow rate, said first flow rate being higher than said second flow rate, comprising:
   the combustion of a first pyrotechnic charge in a first combustion chamber discharging into a second combustion chamber via at least one nozzle; and
   the combustion of a second pyrotechnic charge in said second combustion chamber discharging to the outside via at least one vent;
   wherein said first combustion chamber operates at high pressure and said second combustion chamber operates at low pressure.

2. The method as claimed in claim 1, wherein said first and second charges have the same composition.

3. The method as claimed in claim 1, wherein said first and second charges have the same dimensions and geometry.

4. The method as claimed in claim 1, wherein said first and second charges have identical compositions, dimensions and geometry.

5. The method as claimed in claim 1, wherein said first charge has a smaller thickness to be burnt than that of said second charge.

6. The method as claimed in claim 1, wherein said first charge is composed of a single propellant element.

7. The method as claimed in claim 6, wherein said single propellant element or at least one of said propellant elements of said second charge has at least one of its combustion surfaces inhibited.

8. The method as claimed in claim 1, wherein it is initiated by the single ignition of said first charge in said first combustion chamber.

9. A pyrotechnic method for generating gas at two successive flow rates, a first flow rate then a second flow rate, said first flow rate being higher than said second flow rate, comprising:
   the combustion of a first pyrotechnic charge in the first combustion chamber discharging into a second combustion chamber via at least one nozzle; and
   the combustion of a second pyrotechnic charge in said second combustion chamber discharging to the outside via at least one vent;
   wherein said first combustion chamber operates at high pressure and said second combustion chamber operates at low pressure; and
   wherein the gases generated in said first combustion chamber are discharged from said second combustion chamber via said at least one vent, without flowing through said second charge.

10. The method as claimed in claim 1, wherein the gases originating from the combustion of said second charge are cooled within said second combustion chamber.

11. A pyrotechnic gas generator, comprising: a body which includes two combustion chambers,
   said two chambers communicating via at least one nozzle;
   one of said two chambers being capable of operating at high pressure and which does not lead to the outside; and
   the other of said two chambers being capable of operating at low pressure and which leads to the outside via at least one vent;
   wherein the klemmung of the chamber capable of operating at high pressure is greater than the klemmung of the chamber capable of operating at low pressure.

12. The generator as claimed in claim 11, wherein a single pyrotechnic igniter is mounted on the body and said single pyrotechnic igniter is mounted in said chamber capable of operating at high pressure and such that said chamber capable of operating at high pressure does not lead to the outside.

13. The generator as claimed in claim 11, wherein said at least one vent is arranged on the body of said chamber capable of operating at low pressure, at a location which permits the discharge of the gases generated in said chamber capable of operating at high pressure without these gases flowing through the charge of said chamber capable of operating at low pressure.

14. The generator as claimed in claim 11, wherein said chamber capable of operating at low pressure comprises means for cooling combustion gases generated within it.

15. The generator as claimed in claim 14, wherein said cooling means are added capsule-type elements containing a cooling agent.

16. The method as claimed in claim 1, wherein said first charge is composed of several propellant elements.

17. The method as claimed in claim 16, wherein said several propellant elements are in bulk.

18. The method as claimed in claim 16, wherein said several propellant elements are arranged.

19. The method as claimed in claim 1, wherein said second charge is composed of a single propellant element.

20. The method as claimed in claim 1, wherein said second charge is composed of several propellant elements.

21. The method as claimed in claim 20, wherein said several propellant elements are in bulk.

22. The method as claimed in claim 20, wherein said several propellant elements are arranged.

* * * * *